(12) United States Patent
Narendra et al.

(10) Patent No.: US 11,523,273 B2
(45) Date of Patent: *Dec. 6, 2022

(54) WEARABLE IDENTITY DEVICE FOR FINGERPRINT BOUND ACCESS TO A CLOUD SERVICE

(71) Applicant: SideAssure, Inc., Camas, WA (US)

(72) Inventors: Siva G. Narendra, Portland, OR (US); Prabhakar Tadepalli, Bangalore (IN); Saurav Chakraborty, West Bengal (IN); Donald Allen Bloodworth, Camas, WA (US)

(73) Assignee: SideAssure, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,148

(22) Filed: May 7, 2021

(65) Prior Publication Data

US 2021/0337379 A1      Oct. 28, 2021

Related U.S. Application Data

(63) Continuation of application No. 16/932,088, filed on Jul. 17, 2020, now Pat. No. 11,006,271, which is a
(Continued)

(51) Int. Cl.
*H04W 12/00*    (2021.01)
*H04W 12/06*    (2021.01)
(Continued)

(52) U.S. Cl.
CPC ............ *H04W 12/009* (2019.01); *H04B 5/00* (2013.01); *H04L 9/3231* (2013.01);
(Continued)

(58) Field of Classification Search
CPC ....... H04W 4/00; H04W 4/026; H04W 4/027; H04W 4/24; H04W 4/30; H04W 4/38;
(Continued)

(56) References Cited

U.S. PATENT DOCUMENTS 5,581,173 A    12/1996   Yalla et al.
5,623,552 A     4/1997   Lane
(Continued)

FOREIGN PATENT DOCUMENTS

EP    0774737    5/1997
EP    2048590    4/2009

OTHER PUBLICATIONS

Final Office Action from U.S. Appl. No. 13/842,871 dated Feb. 5, 2016, 17 pgs.
(Continued)

*Primary Examiner* — San Htun
(74) *Attorney, Agent, or Firm* — Mughal IP P.C.

(57) ABSTRACT

A personal digital ID device provides a digital identifier to a service for a predetermined duration in response to user interaction. The user interaction may include a button press. The personal digital ID device may be in the form of a bracelet, a key fob, or other form factor. The service may be provided by a mobile device, in the cloud, or elsewhere.

20 Claims, 13 Drawing Sheets

Related U.S. Application Data continuation of application No. 16/675,670, filed on Nov. 6, 2019, now Pat. No. 10,721,071, which is a continuation of application No. 16/257,956, filed on Jan. 25, 2019, now Pat. No. 10,476,675, which is a continuation of application No. 15/903,935, filed on Feb. 23, 2018, now Pat. No. 10,211,988, which is a continuation of application No. 15/069,548, filed on Mar. 14, 2016, now Pat. No. 9,906,365, which is a continuation of application No. 13/843,402, filed on Mar. 15, 2013, now Pat. No. 9,319,881.

(51) Int. Cl.

| | | |
|---|---|---|
| *H04B 5/00* | (2006.01) | |
| *H04W 12/08* | (2021.01) | |
| *H04L 9/32* | (2006.01) | |
| *H04W 4/80* | (2018.01) | |
| *H04W 4/02* | (2018.01) | |
| *H04L 9/40* | (2022.01) | |
| *H04W 12/02* | (2009.01) | |

(52) U.S. Cl.
CPC .......... *H04L 9/3271* (2013.01); *H04W 12/06* (2013.01); *H04W 12/068* (2021.01); *H04W 12/08* (2013.01); *H04L 63/0853* (2013.01); *H04L 63/0861* (2013.01); *H04L 2209/24* (2013.01); *H04W 4/027* (2013.01); *H04W 4/80* (2018.02); *H04W 12/02* (2013.01)

(58) Field of Classification Search
CPC .......... H04W 4/60; H04W 4/80; H04W 8/18; H04W 52/0267–0277; H04W 76/10–15; H04W 88/00–06; H04B 5/00; H04L 9/3271; H04L 2209/24; H04L 63/0853; H04L 63/0861; H04M 1/21
See application file for complete search history.

(56) References Cited

U.S. PATENT DOCUMENTS

| | | | |
|---|---|---|---|
| 5,930,804 | A | 7/1999 | Yu et al. |
| 6,088,585 | A | 7/2000 | Schmitt et al. |
| 6,225,916 | B1 | 5/2001 | Sugimoto et al. |
| 6,366,202 | B1 | 4/2002 | Rosenthal |
| 6,466,804 | B1 | 10/2002 | Pecen et al. |
| 6,510,346 | B2 | 1/2003 | Gordon |
| 6,709,333 | B1 | 3/2004 | Bradford et al. |
| 6,774,796 | B2 | 8/2004 | Smith |
| 6,970,726 | B2 | 11/2005 | Takayanagi |
| 7,314,167 | B1 | 1/2008 | Kiliccote |
| 7,599,493 | B2 | 10/2009 | Sandhu et al. |
| 7,603,565 | B2 | 10/2009 | Baird et al. |
| 7,762,470 | B2 | 7/2010 | Finn et al. |
| 7,802,293 | B2 | 9/2010 | Boyer et al. |
| 7,869,602 | B1 | 1/2011 | Faros et al. |
| 7,994,915 | B2 | 8/2011 | Sato |
| 8,190,129 | B2 | 5/2012 | Benayed |
| 8,344,853 | B1 | 1/2013 | Warner et al. |
| 8,351,868 | B2 | 1/2013 | Garra et al. |
| 8,430,325 | B2 | 4/2013 | Jain |
| 8,460,103 | B2 | 6/2013 | Mattice et al. |
| 8,596,528 | B2 | 12/2013 | Fernandes et al. |
| 8,699,952 | B2 | 4/2014 | Yeung |
| 8,746,363 | B2 | 6/2014 | Rodriguez et al. |
| 8,770,470 | B2 | 7/2014 | Hammad et al. |
| 8,869,263 | B2 | 10/2014 | Pasquero et al. |
| 9,002,267 | B2 | 4/2015 | Cooper |
| 9,021,563 | B2 | 4/2015 | Ying et al. |
| 2002/0150282 | A1 | 10/2002 | Kinsella |
| 2002/0187808 | A1 | 12/2002 | Vallstrom et al. |
| 2003/0046228 | A1* | 3/2003 | Berney ............... H04L 63/0861 705/41 |
| 2003/0103413 | A1 | 6/2003 | Jacobi et al. |
| 2003/0137588 | A1 | 7/2003 | Wang et al. |
| 2004/0063475 | A1 | 4/2004 | Weng |
| 2004/0073801 | A1 | 4/2004 | Kalogridis et al. |
| 2004/0117638 | A1 | 6/2004 | Monroe |
| 2004/0220807 | A9 | 11/2004 | Tamir et al. |
| 2004/0239481 | A1 | 12/2004 | Beenau et al. |
| 2005/0033689 | A1 | 2/2005 | Bonalle et al. |
| 2005/0039040 | A1 | 2/2005 | Ransom et al. |
| 2005/0116811 | A1 | 6/2005 | Eros et al. |
| 2005/0197103 | A1 | 9/2005 | Inoue |
| 2005/0206518 | A1 | 9/2005 | Welch et al. |
| 2006/0036515 | A1 | 2/2006 | Ingalsbe et al. |
| 2006/0133066 | A1 | 6/2006 | D'Souza |
| 2006/0147040 | A1 | 7/2006 | Lee et al. |
| 2006/0153040 | A1 | 7/2006 | Girish et al. |
| 2006/0219776 | A1 | 10/2006 | Finn |
| 2007/0046476 | A1 | 3/2007 | Hinkamp |
| 2007/0049250 | A1 | 3/2007 | Chambers et al. |
| 2007/0050618 | A1 | 3/2007 | Roux et al. |
| 2007/0079383 | A1 | 4/2007 | Gopalakrishnan |
| 2007/0113099 | A1 | 5/2007 | Takikawa et al. |
| 2007/0180263 | A1 | 8/2007 | Delgrosso et al. |
| 2007/0259717 | A1 | 11/2007 | Mattice et al. |
| 2007/0279852 | A1* | 12/2007 | Daniel ............... H04B 1/385 361/728 |
| 2007/0295803 | A1 | 12/2007 | Levine et al. |
| 2008/0014867 | A1 | 1/2008 | Finn |
| 2008/0126929 | A1 | 5/2008 | Bykov |
| 2008/0304362 | A1 | 12/2008 | Fleming et al. |
| 2008/0305769 | A1 | 12/2008 | Rubinstein |
| 2009/0036056 | A1 | 2/2009 | Oshima et al. |
| 2009/0143104 | A1 | 6/2009 | Loh et al. |
| 2009/0146947 | A1 | 6/2009 | Ng |
| 2009/0163175 | A1 | 6/2009 | Shi et al. |
| 2009/0195350 | A1* | 8/2009 | Tsern ............... G06F 1/1632 340/3.1 |
| 2009/0231960 | A1 | 9/2009 | Hutcheson et al. |
| 2009/0247078 | A1 | 10/2009 | Sklovsky et al. |
| 2009/0249478 | A1 | 10/2009 | Rosener et al. |
| 2009/0276626 | A1 | 11/2009 | Lazaridis et al. |
| 2009/0312011 | A1 | 12/2009 | Huomo et al. |
| 2010/0049987 | A1 | 2/2010 | Ettorre et al. |
| 2010/0225443 | A1 | 9/2010 | Bayram et al. |
| 2010/0299198 | A1 | 11/2010 | Catania et al. |
| 2010/0304670 | A1 | 12/2010 | Shuo |
| 2010/0330908 | A1 | 12/2010 | Maddern et al. |
| 2011/0119759 | A1 | 5/2011 | McKeeth |
| 2011/0138176 | A1 | 6/2011 | Mansour |
| 2011/0140855 | A1 | 6/2011 | Funamoto et al. |
| 2011/0140913 | A1 | 6/2011 | Montenero |
| 2011/0187642 | A1 | 8/2011 | Faith et al. |
| 2011/0212707 | A1 | 9/2011 | Mahalal |
| 2011/0214158 | A1 | 9/2011 | Pasquero et al. |
| 2011/0215921 | A1 | 9/2011 | Ben Ayed et al. |
| 2011/0231292 | A1 | 9/2011 | McCown |
| 2011/0240748 | A1 | 10/2011 | Doughty et al. |
| 2011/0245316 | A1 | 10/2011 | Rios |
| 2011/0250840 | A1 | 10/2011 | Lee et al. |
| 2011/0275316 | A1 | 11/2011 | Suumaki et al. |
| 2012/0016793 | A1* | 1/2012 | Peters ............... G06Q 20/346 705/39 |
| 2012/0019361 | A1 | 1/2012 | Ben Ayed |
| 2012/0019379 | A1* | 1/2012 | Ben Ayed ............... G06F 21/32 340/5.82 |
| 2012/0032782 | A1 | 2/2012 | Colella |
| 2012/0041767 | A1 | 2/2012 | Hoffman et al. |
| 2012/0054498 | A1 | 3/2012 | Rickman |
| 2012/0075107 | A1 | 3/2012 | Newman et al. |
| 2012/0084563 | A1 | 4/2012 | Singhal |
| 2012/0089948 | A1 | 4/2012 | Lim et al. |
| 2012/0094600 | A1 | 4/2012 | Dellostritto et al. |
| 2012/0207305 | A1 | 8/2012 | Gallo et al. |
| 2012/0221475 | A1 | 8/2012 | Grigg et al. |
| 2012/0232430 | A1 | 9/2012 | Boissy et al. |
| 2012/0238206 | A1 | 9/2012 | Singh et al. |
| 2012/0252405 | A1 | 10/2012 | Lortz et al. |
| 2012/0254960 | A1 | 10/2012 | Lortz et al. |
| 2012/0258773 | A1 | 10/2012 | Rivera et al. |

(56) References Cited

U.S. PATENT DOCUMENTS

| | | | |
|---|---|---|---|
| 2012/0297190 A1 | 11/2012 | Shen et al. |
| 2012/0302163 A1 | 11/2012 | Kitchen |
| 2013/0019284 A1 | 1/2013 | Pacyga et al. |
| 2013/0060868 A1 | 3/2013 | Davis et al. |
| 2013/0081122 A1 | 3/2013 | Svigals et al. |
| 2013/0092741 A1 | 4/2013 | Loh et al. |
| 2013/0095757 A1 | 4/2013 | Abdelsamie et al. |
| 2013/0117832 A1 | 5/2013 | Gandhi et al. |
| 2013/0119128 A1 | 5/2013 | Straumann |
| 2013/0152185 A1 | 6/2013 | Singh et al. |
| 2013/0159119 A1 | 6/2013 | Henderson et al. |
| 2013/0169430 A1 | 7/2013 | Shook |
| 2013/0212661 A1 | 8/2013 | Neafsey et al. |
| 2013/0219164 A1 | 8/2013 | Hamid |
| 2013/0243189 A1 | 9/2013 | Ekberg et al. |
| 2013/0263252 A1 | 10/2013 | Lien et al. |
| 2013/0268931 A1 | 10/2013 | O'Hare et al. |
| 2013/0275748 A1 | 10/2013 | Lu |
| 2013/0298224 A1 | 11/2013 | Heilpern |
| 2013/0332353 A1 | 12/2013 | Aidasani et al. |
| 2014/0011479 A1 | 1/2014 | Puga et al. |
| 2014/0040139 A1 | 2/2014 | Brudnicki et al. |
| 2014/0073321 A1 | 3/2014 | Kuusilinna et al. |
| 2014/0090039 A1 | 3/2014 | Bhow |
| 2014/0101755 A1 | 4/2014 | Tang |
| 2014/0121982 A1 | 5/2014 | Rauhala |
| 2014/0143155 A1 | 5/2014 | Karlov et al. |
| 2014/0216914 A1 | 8/2014 | Pope et al. |
| 2014/0281565 A1 | 9/2014 | Narendra et al. |
| 2014/0310113 A1 | 10/2014 | Sengupta et al. |

OTHER PUBLICATIONS

Final Office Action from U.S. Appl. No. 13/842,871 dated Jul. 1, 2015, 19 pgs.
Final Office Action from U.S. Appl. No. 13/842,937 dated Aug. 4, 2015, 20 pgs.
Final Office Action from U.S. Appl. No. 13/843,065 dated Jan. 23, 2015, 17 pgs.
Final Office Action from U.S. Appl. No. 13/843,091 dated Mar. 5, 2015, 11 pgs.
Final Office Action from U.S. Appl. No. 13/843,402 dated May 1, 2015, 15 pgs.
Final Office Action from U.S. Appl. No. 13/843,529 dated Jul. 15, 2016, 18 pgs.
Final Office Action from U.S. Appl. No. 13/843,529 dated Oct. 8, 2015, 17 pgs.
Final Office Action from U.S. Appl. No. 13/843,628 dated Sep. 14, 2015, 15 pgs.
Final Office Action from U.S. Appl. No. 13/843,831 dated Sep. 25, 2015, 17 pgs.
Final Office Action from U.S. Appl. No. 13/843,988 dated Sep. 25, 2015, 14 pgs.
Final Office Action from U.S. Appl. No. 13/844,141 dated May 12, 2015, 24 pgs.
Final Office Action from U.S. Appl. No. 13/844,183 dated Aug. 21, 2015, 13 pgs.
Final Office Action from U.S. Appl. No. 13/844,216 dated Sep. 18, 2015, 13 pgs.
Final Office Action from U.S. Appl. No. 13/844,255 dated Jan. 14, 2016, 25 pgs.
Final Office Action from U.S. Appl. No. 13/844,255 dated May 14, 2015, 18 pgs.
Final Office Action from U.S. Appl. No. 13/844,301 dated Oct. 28, 2015, 17 pgs.
International Preliminary Report on Patentability from PCT/US2014/023533 dated Sep. 24, 2015, 9 pgs.
International Search Report and Written Opinion from PCT/US2014/023533 dated Jul. 10, 2014, 10 pgs.
Non-Final Office Action from U.S. Appl. No. 13/842,871 dated Sep. 11, 2014, 23 pgs.
Non-Final Office Action from U.S. Appl. No. 13/842,871 dated Sep. 24, 2015, 18 pgs.
Non-Final Office Action from U.S. Appl. No. 13/842,937 dated Jan. 13, 2016, 9 pgs.
Non-Final Office Action from U.S. Appl. No. 13/842,937 dated Sep. 11, 2014, 24 pgs.
Non-Final Office Action from U.S. Appl. No. 13/843,000 dated Nov. 19, 2014, 15 pgs.
Non-Final Office Action from U.S. Appl. No. 13/843,065 dated Aug. 14, 2014, 18 pgs.
Non-Final Office Action from U.S. Appl. No. 13/843,065 dated Oct. 22, 2015, 17 pgs.
Non-Final Office Action from U.S. Appl. No. 13/843,091 dated Jul. 31, 2014, 8 pgs.
Non-Final Office Action from U.S. Appl. No. 13/843,181 dated May 13, 2015, 13 pgs.
Non-Final Office Action from U.S. Appl. No. 13/843,402 dated Oct. 2, 2015, 15 pgs.
Non-Final Office Action from U.S. Appl. No. 13/843,402 dated Oct. 7, 2014, 15 pgs.
Non-Final Office Action from U.S. Appl. No. 13/843,529 dated Jan. 15, 2015, 20 pgs.
Non-Final Office Action from U.S. Appl. No. 13/843,529 dated Jan. 20, 2016, 18 pgs.
Non-Final Office Action from U.S. Appl. No. 13/843,628 dated Mar. 18, 2015, 15 pgs.
Non-Final Office Action from U.S. Appl. No. 13/843,694 dated Nov. 18, 2014, 60 pgs.
Non-Final Office Action from U.S. Appl. No. 13/843,831 dated Feb. 3, 2016, 19 pgs.
Non-Final Office Action from U.S. Appl. No. 13/843,831 dated Jan. 15, 2015, 24 pgs.
Non-Final Office Action from U.S. Appl. No. 13/843,988 dated Feb. 4, 2016, 16 pgs.
Non-Final Office Action from U.S. Appl. No. 13/843,988 dated Jan. 15, 2015, 18 pgs.
Non-Final Office Action from U.S. Appl. No. 13/844,141 dated Oct. 16, 2014, 34 pgs.
Non-Final Office Action from U.S. Appl. No. 13/844,183 dated Dec. 26, 2014, 11 pgs.
Non-Final Office Action from U.S. Appl. No. 13/844,216 dated Jan. 30, 2015, 14 pgs.
Non-Final Office Action from U.S. Appl. No. 13/844,255 dated Sep. 4, 2014, 18 pgs.
Non-Final Office Action from U.S. Appl. No. 13/844,255 dated Sep. 4, 2015, 20 pgs.
Non-Final Office Action from U.S. Appl. No. 13/844,301 dated May 18, 2015, 17 pgs.
Non-Final Office Action from U.S. Appl. No. 13/844,339 dated Oct. 14, 2014, 11 pgs.
Non-Final Office Action from U.S. Appl. No. 14/741,493 dated Oct. 26, 2016, 12 pgs.
Non-Final Office Action from U.S. Appl. No. 15/069,548 dated Jun. 30, 2017, 24 pgs.
Non-Final Office Action from U.S. Appl. No. 15/903,935 dated Jun. 4, 2018, 23 pgs.
Non-Final Office Action from U.S. Appl. No. 16/257,956 dated Apr. 4, 2019, 28 pgs.
Non-Final Office Action from U.S. Appl. No. 16/675,670 dated Dec. 12, 2019, 45 pgs.
Non-Final Office Action dated Oct. 5, 2020 for U.S. Appl. No. 16/932,088.
Notice of Allowance from U.S. Appl. No. 13/843,000 dated Aug. 12, 2015, 10 pgs.
Notice of Allowance from U.S. Appl. No. 13/843,091 dated Nov. 9, 2015, 14 pgs.
Notice of Allowance from U.S. Appl. No. 13/843,181 dated Oct. 21, 2015, 8 pgs.
Notice of Allowance from U.S. Appl. No. 13/843,402 dated Mar. 9, 2016, 9 pgs.
Noticeof Allowance from U.S. Appl. No. 13/843,529 dated Jun. 5, 2017, 12 pgs.

(56) References Cited

OTHER PUBLICATIONS

Notice of Allowance from U.S. Appl. No. 13/843,694 dated Aug. 26, 2015, 17 pgs.
Notice of Allowance from U.S. Appl. No. 13/843,831 dated Aug. 3, 2016, 11 pgs.
Notice of Allowance from U.S. Appl. No. 13/843,988 dated Aug. 9, 2016, 11 pgs.
Noticeof Allowance from U.S. Appl. No. 13/844,141 dated Sep. 29, 2015, 10 pgs.
Notice of Allowance from U.S. Appl. No. 13/844,183 dated Aug. 28, 2015, 5 pgs.
Notice of Allowance from U.S. Appl. No. 13/844,339 dated Jun. 12, 2015, 7 pgs.
Notice of Allowance from U.S. Appl. No. 14/741,493 dated Apr. 19, 2017, 8 pgs.
Notice of Allowance from U.S. Appl. No. 15/069,548 dated Oct. 19, 2017, 5 pgs.
Notice of Allowance from U.S. Appl. No. 15/237,624 dated Dec. 20, 2016, 13 pgs.
Notice of Allowance from U.S. Appl. No. 15/237,735 dated Jan. 5, 2017, 14 pgs.
Notice of Allowance from U.S. Appl. No. 15/249,081 dated Apr. 13, 2017, 16 pgs.
Notice of Allowance from U.S. Appl. No. 15/903,935 dated Oct. 9, 2018, 5 pgs.
Notice of Allowance from U.S. Appl. No. 16/257,956 dated Jul. 11, 2019, 5 pgs.
Notice of Allowance from U.S. Appl. No. 16/675,670 dated Mar. 13, 2020, 5 pgs.
Notice of Allowance dated Jan. 19, 2021 for U.S. Appl. No. 16/932,088.
Beadle, H. et al., "Using Location and Environment Awareness in Mobile Communications", International Conference on Information, Communication and Signal Processing, ICICS '97, Sep. 9-12, 1997, 5 pgs.
Kwapisz, J. et al., "Cell Phone-Based Biometric Identification", 2010 Fourth IEEE International Conference on Biometrics Compendium, 7 pgs.
Lin, C. et al., "A New Non-Intrusive Authentication Method based on the Orientation Sensor for Smartphone Users", 2012 IEEE Sixth International Conference on Software Security and Reliability, 8 pgs.
Wroblewski, L. "Apples Overloaded iPhone Button", <http://www.lukew.com/ff/entry.asp?1382> Aug. 16, 2011, 2 pgs.
Yuan, J. et al., "ISILON—An Intelligent System for Indoor Localization and Navigation Based on RFID and Ultrasonic Techniques", Proceedings of the 8th World Congress on Intelligent Control and Automation, Jul. 6-9, 2010, 6 pgs.

\* cited by examiner

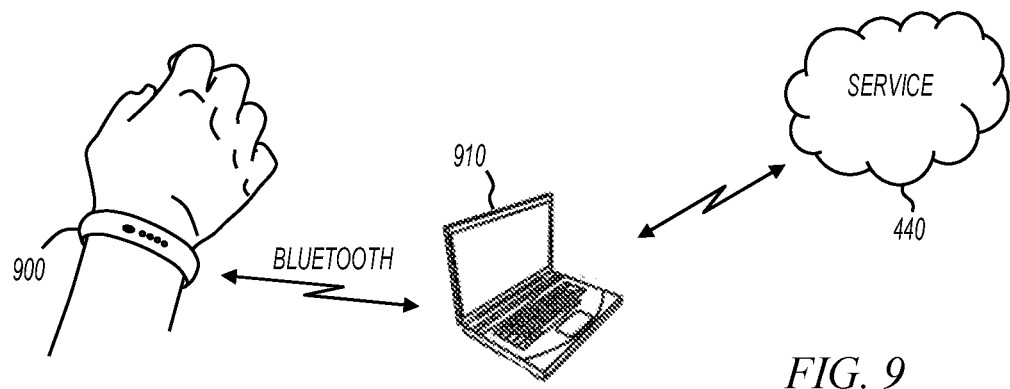
FIG. 9
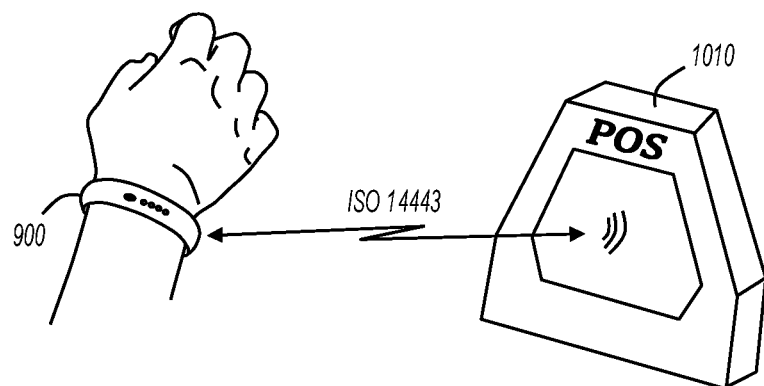
FIG. 10
FIG. 11
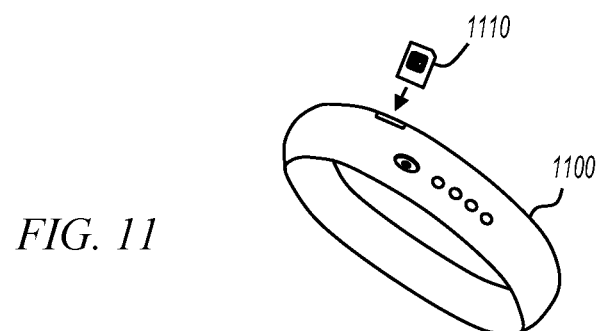

WEARABLE IDENTITY DEVICE FOR FINGERPRINT BOUND ACCESS TO A CLOUD SERVICE

CLAIM FOR PRIORITY

This application is a Continuation of, and claims the benefit of priority to U.S. Patent application Ser. No. 16/932,088, filed Jul. 17, 2020, now issued as U.S. Pat. No. 11,006,271, on May 11, 2021, and which is a Continuation of, and claims the benefit of priority to U.S. patent application Ser. No. 16/675,670, filed Nov. 6, 2019, now issued as U.S. Pat. No. 10,721,071 on Jul. 21, 2020, which is a Continuation of, and claims the benefit of priority to U.S. patent application Ser. No. 16/257,956, on Jan. 25, 2019, now issued as U.S. Pat. No. 10,476,675, on Nov. 12, 2019, which is a Continuation of, and claims the benefit of priority to U.S. patent application Ser. No. 15/903,935, on Feb. 23, 2018, now issued as U.S. Pat. No. 10,211,988 on Feb. 19, 2019, which is a Continuation of, and claims the benefit of priority to U.S. patent application Ser. No. 15/069,548, on Mar. 14, 2016, now issued as U.S. Pat. No. 9,906,365 on Feb. 27, 2018, which is a Continuation of, and claims the benefit of priority to U.S. patent application Ser. No. 13/843,402, on Mar. 15, 2013, now issued as U.S. Pat. No. 9,319,881 on Apr. 19, 2016, and which is incorporated by reference in entirety.

FIELD

The present invention relates generally to mobile devices, and more specifically to identity representation in mobile devices.

BACKGROUND

Mobile devices typically authenticate to cloud services using passwords. For example, as shown in FIG. 1, mobile device 100 may prompt a user for a password in order access cloud service 102. This operation is also shown in FIG. 2, where an application is started on the mobile device, and then a user enters a password to access the cloud service.

As an example, a user may open a web browser on a smartphone (or any other app on the mobile device) and then navigate to a merchant's website (cloud service). The merchant website then prompts for the user's password prior to allowing the user access to the user's account at the merchant. The user's account at the merchant may store sensitive information such as credit card numbers, addresses, phone numbers, and the like.

Password-based cloud service authentication is vulnerable to hacking. If a hacker gains access to a password file (storing hashed passwords) from the merchant, then the universe of hashed password values can be compared to entries in the password file to gain access to individual user accounts. Sensitive user information may be compromised as a result.

BRIEF DESCRIPTION OF THE DRAWINGS

FIG. 9 shows a personal digital identity device interacting with a laptop computer and cloud service in accordance with various embodiments of the present invention;
FIG. 10 shows a personal digital identity device interacting with a point of sale terminal in accordance with various embodiments of the present invention;
FIG. 11 shows a personal digital identity device with a removable crypto/cipher engine in accordance with various embodiments of the present invention.

DESCRIPTION OF EMBODIMENTS

Figure 1:
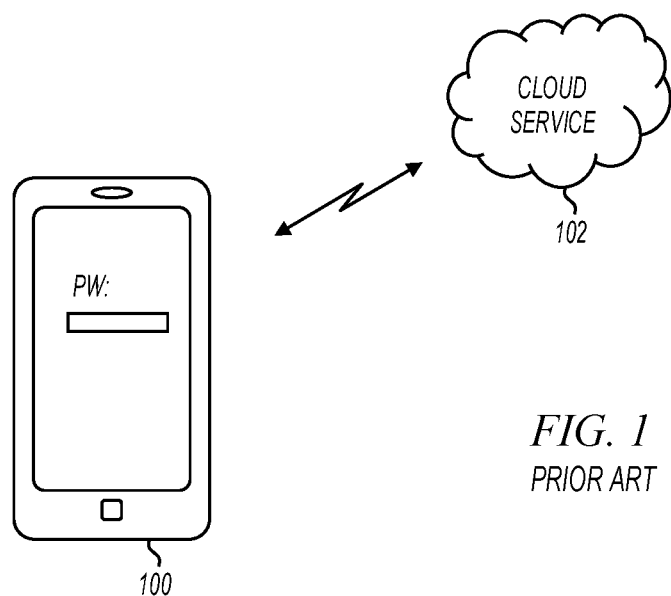
FIGS. 1 and 2 show a mobile device authenticating to a cloud service in accordance with the prior art.
Figure 2:
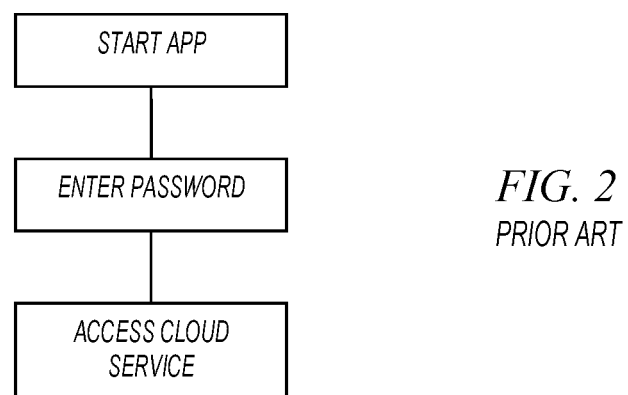

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 3:
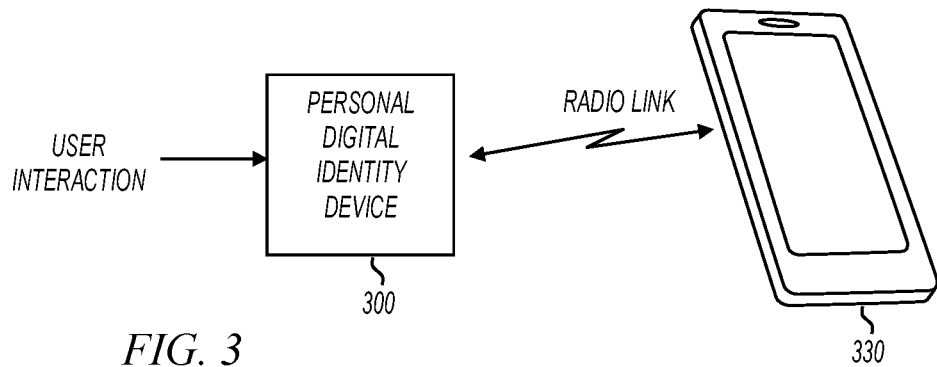
FIG. 3 shows a block diagram of a personal digital identity device interacting with a user and a mobile device in accordance with various embodiments of the present invention.

FIG. 3 shows a block diagram of a personal digital identity device interacting with a user and a mobile device in accordance with various embodiments of the present invention. Personal digital identity (ID) device 300 is shown communicating with mobile device 330 over a radio link. In some embodiments, personal digital ID device 300 stores a digital identifier that is provided to mobile device 330 only after a user interacts with device 300. For example, the radio link may be available only after user interaction with personal digital ID device 300. Mobile device 330 may be any electronic device such as a smartphone, a table, a personal computer, a laptop, a phablet, a mobile phone, a set top box, a kiosk, a point-of-sale terminal, or the like.

The digital identifier provided by personal digital ID device 300 may be used for authentication. For example, the user in possession of personal digital ID device 300 may interact with the device for the purpose of authenticating to mobile device 330 or authenticating to a service in communication with mobile device 300. Personal digital ID device 300 may take any form. For example, personal digital ID device 300 may be a bracelet, a card, a key fob, or the like.

Figure 4:
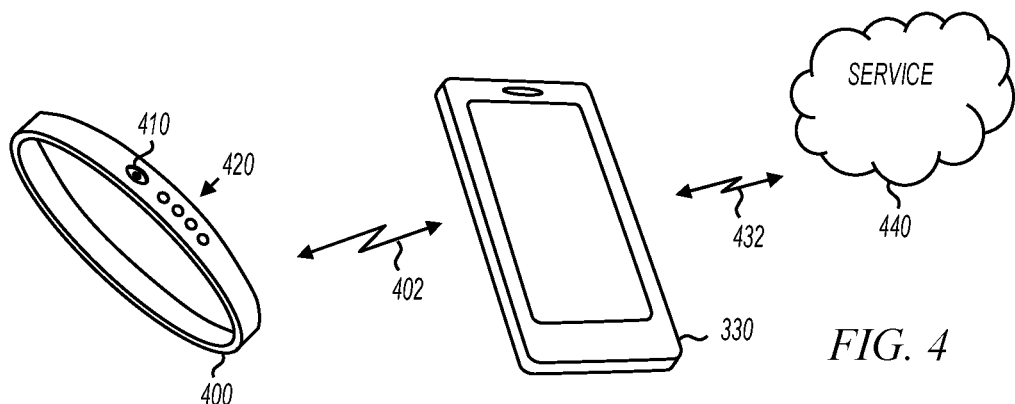
FIG. 4 shows a personal digital identity device interacting with a mobile device and cloud service in accordance with various embodiments of the present invention.

FIG. 4 shows a personal digital identity device interacting with a mobile device and cloud service in accordance with various embodiments of the present invention. Personal digital ID device 400 communicates with mobile device 330 over radio link 402, and mobile device 330 communicates with a cloud service 440 over radio link 432. The combination of elements shown in FIG. 4 may be advantageously used to increase security when accessing cloud services using a mobile device.

In some embodiments, radio link 402 is a near-field radio link and in other embodiments, radio link 402 is a non-near-field radio link. For example, radio link 402 may be a BLUETOOTH™ radio link (non-near-field), or may be a near-field communications (NFC) radio link (near-field) such as an ISO 14443 compatible radio link, an ISO 18092 compatible radio link, or an IEEE 802.15.4 compatible radio link.

As used herein, the term "near-field" refers to communication protocols and compatible radios in which the maximum intended communication distance is less than the wavelength of the radio wave used for that communication. ISO 14443 (NFC) is an example of near-field because the wavelength is on the order of 870 inches and the intended communication distance is only a few inches. All communications protocols and compatible radios that are not near-field are referred to herein as "non-near-field." An example of a non-near-field protocol is BLUETOOTH™ because the wavelength is on the order of 4.5 inches and the intended communication distance is typically much greater than 4.5 inches. The use of the term "non-near-field radio" is not meant to imply that the distance of communication cannot be less than the wavelength for the non-near-field radio.

Communication link 432 between mobile device 330 and cloud service 440 may be any type of link that is possible between a mobile device and cloud service. For example, communication link 432 may be a radio link such as a cell phone signal or a WiFi signal, or may be a wired link such as a universal serial bus (USB) or Ethernet link.

Personal digital ID device 400 includes button 410 and light emitting diodes (LEDs) 420. In some embodiments, personal digital ID device 400 includes a housing in the shape of a personal accessory. For example, personal digital ID device 400 is shown as a bracelet in FIG. 4. In some embodiments the housing is flexible, such that the personal digital ID device may be stretched. In other embodiments, the housing is rigid. One skilled in the art will understand that personal digital ID device 400 may be constructed from various different materials to achieve a desired level of pliability, and constructed in various different shapes and sizes.

In operation, a user may start an application on mobile device 330 with the intention of accessing cloud services 440. The application then prompts the user to press button 410 on personal digital ID device 400. Personal digital ID device 400 then communicates with mobile device 330 over radio link 402. In some embodiments, personal digital ID device 400 includes security hardware that provides a secure level of authentication only after button 410 is pressed. In these embodiments, user interaction (button press) with personal digital ID device 400 is required before authentication can take place.

In some embodiments, secure authentication may take place between personal digital ID device 400 and mobile device 330. For example, a button press may make security hardware within personal digital ID device 400 available for authentication purposes for a predetermined period of time. Mobile device 330 may then communicate with security hardware within personal digital ID device 400 to authenticate the user to the mobile device.

In other embodiments, secure authentication may take place between personal digital ID device 400 and cloud service 440. For example, a button press may make security hardware within personal digital ID device 400 available for authentication purposes for a predetermined period of time. Cloud service 440 may then communicate with the security hardware within personal digital ID device 400 to authenticate the user to the cloud service. Because personal digital ID device 400 uses radio link 402 to reach mobile device 330 which in turn uses communication link 432 to reach service 440, one can say that in some embodiments, personal digital ID device 400 is able to communicate with service 440 with the mobile device 330 as an intermediary. In these embodiments, both mobile device 330 and personal digital ID device 400 are used for successful access to service 440.

Because personal digital ID device 400 requires user interaction before making the security hardware available, a user must be in possession of personal digital ID device 400 in order to be authenticated. This is significantly more robust than a password-only authentication method. Hackers are unable to hack into a user's account using software techniques alone.

Button 410 is an example of a hardware-based interaction device. Authentication is only possible after the user interacts with the hardware-based interaction device. The various embodiments of the present invention are not limited to a button. For example, any type of hardware interaction may be employed without departing from the scope of the present invention. Additional examples of hardware-based interactions devices are described below.

Light emitting diodes 420 may be used for any purpose. For example, in some embodiments, LEDs 420 are used to provide the user with state information such as battery level or connection state. In some embodiments, LEDs 420 include at least one red LED and at least one non-red LED. Battery charge information may be provided by illuminating a number of non-red LEDs corresponding to the charge remaining. When a low battery level exists, one or more red LEDs may be illuminated. As shown in FIG. 4, LEDs 420 may be located in a line on personal digital ID device 400, but this is not a limitation of the present invention.

An example authentication sequence between personal digital ID device 400 and cloud service 440 is now described. This example uses an online bookseller as the cloud service, a smartphone as the mobile device, and a bracelet shaped personal digital ID device with a button. The online bookseller stores credit card information in a user's account and requires users to authenticate to the cloud service before allowing access to the user's account.

A user in possession of both personal digital ID device 400 and mobile device 330 wishes to purchase an item from the bookseller's online store. The user opens an application on mobile device 330. This application may be a web browser or any other application that provides access to the bookseller's online store. The mobile device then prompts the user to press the button on the personal digital ID device in order to authenticate. The user presses the button and is authenticated to the online bookseller. In some embodiments, this is the extent of user involvement in the authentication process. That is to say, after one button press, the user is authenticated. In other embodiments, the authentication sequence may require more interaction from the user. For example, the user may also be required to enter a password or answer a security question using mobile device 330, or the like.

The user authenticated by pressing the button once in previous example. In some embodiments, the user authenticates by pressing the button twice or more times. In still further embodiments, the user is authenticated only after pressing the button for longer than a predetermined duration of time (e.g., longer than a threshold).

After the user interacted with the button, one more action took place without the user's involvement. For example, in response to the button press, personal digital ID device 400 made a security mechanism available or communication over radio link 402. In some embodiments, personal digital ID device 400 makes the security device available by powering up a radio for a predetermined amount of time.

Figure 5:
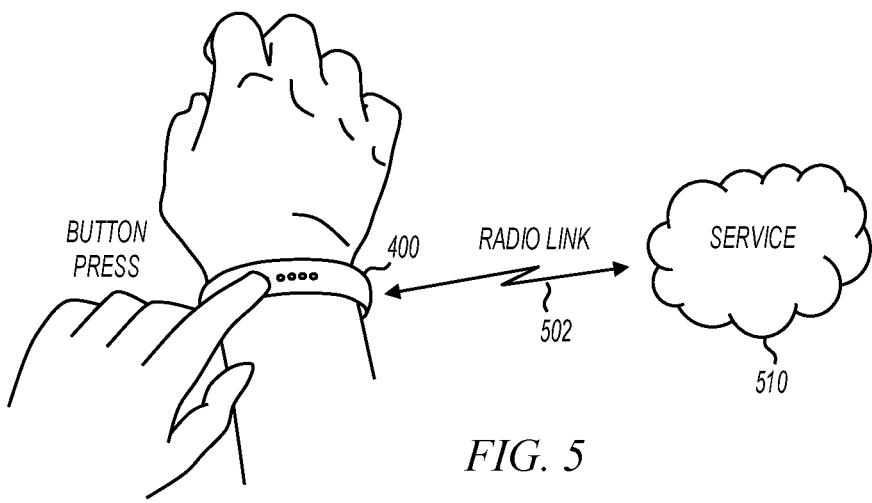
FIG. 5 shows a user interacting with the personal digital identity device of FIG. 4.

FIG. 5 shows a user interacting with the personal digital identity device of FIG. 4. In the example of FIG. 5, a user is wearing personal digital ID device 400 on a wrist. The button is pressed to authenticate to service 510 over radio link 502. Note that radio link 502 is not necessarily the same as radio link 402 (FIG. 4). In some embodiments, radio link 402 may be a non-near-field radio link, and radio link 502 may a near-field radio link. In other embodiments, radio link 402 may be a near-field radio link, and radio link 502 may a non-near-field radio link. In still further embodiments, both radio links 402 and 502 are near-field radio links or non-near-field radio links.

Service 510 may be a service accessible on a mobile device such as mobile device 330 (FIG. 3), or may be a service accessible through a mobile device, such as service 440 (FIG. 4). Service 510 may also be a service unrelated to a mobile device. For example, service 510 may be a building access control device. In these embodiments, a button press may provide a user access to a building. Also, for example, service 510 may be a point of sale (POS) device, a set top box, a kiosk, or the like. In these embodiments, a button press may effect a mobile payment resulting in the purchase of digital or physical goods.

Service 510 may be thick or thin application on a smartphone, or a website running on a tablet or any combination. Service 510 may also be in the cloud, in which case, personal digital ID device 400 communicates with a mobile device (e.g., smartphone), which then communicates with the service in the cloud.

Service 510 may also be an application running on another device, such as a phone, a device in the cloud, or a device on the other end of a near-field link, such as a POS or a kiosk.

Figure 6:
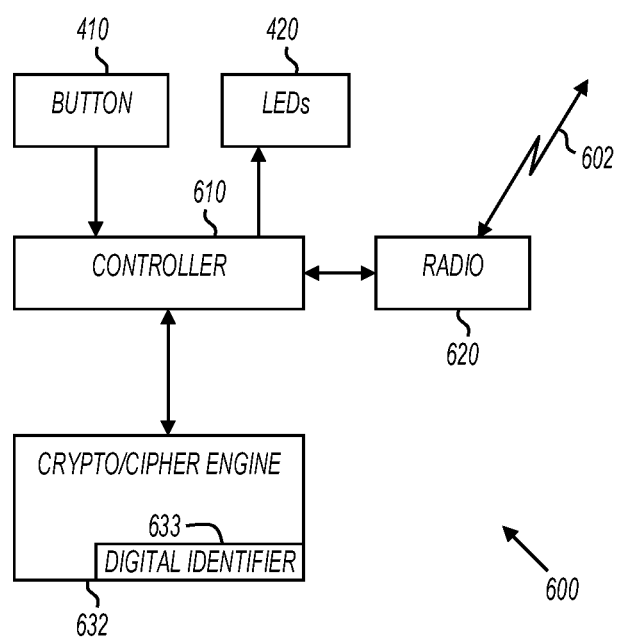
FIGS. 6, 7, and 8 show block diagrams of personal digital identity devices in accordance with various embodiments of the present invention.

FIG. 6 shows a block diagram of a personal digital identity device in accordance with various embodiments of the present invention. Personal digital ID device 600 shows an example architecture for personal digital ID device 300 (FIG. 3) or personal digital ID device 400 (FIG. 4), or any of the other personal digital ID devices described herein.

Personal digital ID device 600 includes controller 610, radio 620, button 410, LEDs 420, and crypto/cipher engine 632 with digital identifier 633. Button 410 is an example of a hardware-based interaction device as described above. LEDs 420 are also described above. Radio 620 may be any type of radio, including a near-field radio or a non-near-ield radio.

Controller 610 is coupled to button 410, LEDs 420, radio 620, and crypto/cipher engine 632. Controller 610 is any type of controller capable of making digital identifier 633 available over radio link 602 in response to user interaction with button 410. For example, in some embodiments, controller 610 may be a dedicated state machine that is not programmable beyond its initial design, although this is not a limitation of the present invention. In these embodiments, controller 610 may not be modified by a user with ill intent without modifying hardware. This is a difficult task and adds to security. In other embodiments, controller 610 is a microcontroller with a dedicated, hard coded, program store. In these embodiments, controller 610 performs actions in response to stored instructions; however, modifying instructions still requires a change in hardware. In still further embodiments, controller 610 is a processor such as a microprocessor or a digital signal processor. In these embodiments, controller 610 performs actions in response to executing stored instructions. An example personal digital ID device with a processor is described below with reference to FIG. 7.

Crypto/cipher engine 632 is any device that can provide a secure data store and/or encryption capabilities in the service of personal digital ID device 600. For example, in some embodiments, crypto/cipher engine 632 may be a dedicated secure storage and computation area within controller 610 that stores and processes digital identifier 633, either as encrypted data or as clear data or in any combination of encrypted and clear data. In other embodiments, controller 610 is part of the crypto/cipher engine 632 and crypto/cipher engine 632 is a smartcard secure element. In other embodiments, crypto/cipher engine 632 is separate from controller 610, such as a smartcard secure element. Various embodiments having smartcard secure elements are described in more detail below.

In operation, personal digital ID device 600 provides identity and/or authentication services to a user in response to user interaction with the device. For example, in some embodiments, controller 610 turns on radio 620 for a predetermined period of time (e.g., a few seconds to a few minutes) in response to user interaction with button 410. Also for example, in some embodiments, controller 610 makes services provided by crypto/cipher engine 632 (including, but not limited to, digital identifier 633) available over radio link 620 for a predetermined period of time in response to user interaction with button 410. The ID and/or authentication services may be used to authenticate a user to a mobile device or to a cloud service, or to any other service. The predetermined period of a few seconds to a few minutes is provided as an example, and the various embodiments of the invention are not so limited.

Digital identifier 633 may take on any form. For example, in some embodiments, digital identifier 633 may represent an actual identity such as a credit card number or a more complex combination of various data and a program executing on the data to uniquely identify the personal digital ID device. An example of a program executing could be a security applet such as PKCS #15 or payment applet such as a Visa VSDC applet running on a java card operating system of a smartcard device. Here the smartcard device is the crypto/cipher engine. An example of various data could be an X.509 Certificate or Visa Card Personalization Data. In some embodiments, digital identifier 633 may be a fixed value, and in other embodiments, digital identifier 633 may be a variable value. For example, in some embodiments, digital identifier 633 may include random information that pads the actual useful data for obfuscation purposes.

In some embodiments, digital identifier 633 may be a password, a fingerprint, or other user authentication factor (UAF), encrypted or in the clear; digital certificates, keys, keys for symmetric or asymmetric cryptography functions, unique digital identifiers, or the like. The UAF can come to the personal digital ID device via any of the radio links, or from the personal digital ID device itself, or any combination thereof.

In some embodiments, digital identifier 633 includes two shared secret keys K1 and K2 that are shared with a cloud service. Once personal digital ID device 600 is made available to a cloud service, the digital ID device could generate a random number R1, encrypt it with the shared secret key K1, and send it to the cloud service. The cloud service will then decrypt R1 with key K1, then encrypt with key K2 both R1 and another random value R2 and send the result back to personal digital ID device 600. Personal digital ID device 600 will then decrypt this payload with K2. If it successfully recovers R1, then it knows that it is communicating with an authenticated cloud service that it trusts. Personal digital ID device 600 then encrypts R2 back with K1 and sends it to the cloud service which will in turn decrypt it with K1 and if it successfully recovers R2, then it knows that it is communicating with an authenticated personal digital ID device it trusts. The use of K1, K2, R1, and R2 are mere examples. The authentication sequence of events is also provided as an example. Other embodiments use different authentication sequences. The authentication sequence mentioned above could involve more complex steps such as the use of public key infrastructure standards such as PKCS or involve methods for challenge-response. The connection made available could not only be used for authentication or mutual authentication but also for establishment of a secure channel between the personal digital ID device and the cloud service where additional unique data stored in the personal digital ID device such as payment information could then be communicated securely by encrypting with a session specific key such as R2 to enact transactions in the cloud service.

Again, the use of R2 for secure communication post secure mutual authentication is only to be considered an example. The entire set of processes defined above is to illustrate what it means to make the personal digital ID device available to a service in response to user interaction. Many such processes are possible and known to those skilled in the art of security engineering, cyber security, secure identity, identity management, trusted service management, or smartcard protocols. Such processes could also help the intermediate device send secure information to a cloud service or receive secure information from the cloud service. Such secure information could be but not limited to transactions and outcomes, additional personal information, files, emails, voice connections, and messages.

Figure 7:
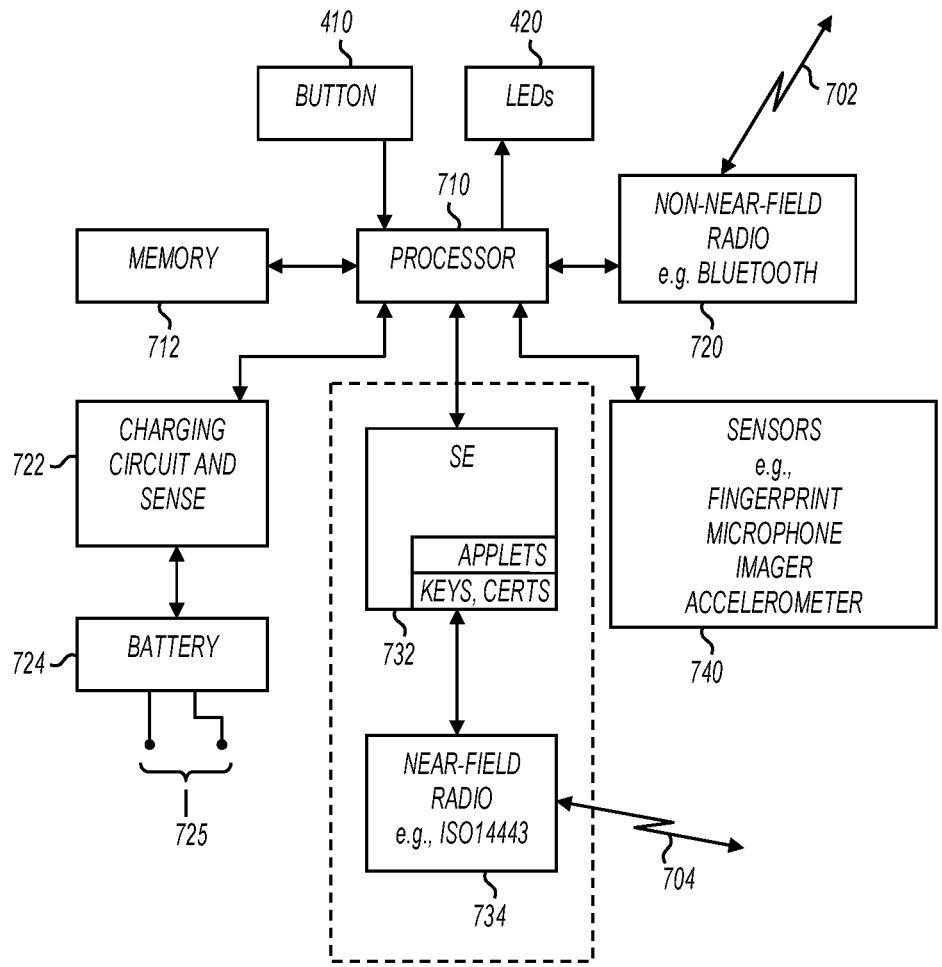

FIG. 7 shows a block diagram of a personal digital identity device in accordance with various embodiments of the present invention. Personal digital ID device 700 shows an example architecture for personal digital ID device 300 (FIG. 3) or personal digital ID device 400 (FIG. 4), or any of the other personal digital ID devices described herein.

Personal digital ID device 700 includes processor 710, non-near-field radio 720, button 410, LEDs 420, memory 712, charging circuits 722, battery 724, sensors 740, secure element (SE) 732, and near-field radio 734. Button 410 is an example of a hardware-based interaction device as described above. LEDs 420 are also described above. Although FIG. 7 shows a non-near-field radio communicating over link 702, this is not a limitation of the present invention. For example, in some embodiments, radio 720 is a near-field radio.

Processor 710 may be any type of processor capable of executing instructions stored in memory 712 and capable of interfacing with the various components shown in FIG. 7. For example, processor 710 may be a microprocessor, a digital signal processor, an application specific processor, or the like. In some embodiments, processor 710 is a component within a larger integrated circuit such as a system on chip (SOC) application specific integrated circuit (ASIC).

Memory 712 may include any type of memory device. For example, memory 712 may include volatile memory such as static random-access memory (SRAM), or nonvolatile memory such as FLASH memory. Memory 712 is encoded with (or has stored therein) one or more software modules (or sets of instructions), that when accessed by processor 710, result in processor 710 performing various functions. In some embodiments, memory 710 includes a software application to turn on one or both of radios 720 and 734 in response to user interaction, and does not include an operating system (OS). The lack of an operating system increases the security of personal digital ID device 700 in part because it is more difficult for a hacker to run illicit software on the device. The lack of an operating system in personal digital ID device 700 is not a limitation of the present invention.

Memory 712 represents a computer-readable medium capable of storing instructions, that when accessed by processor 710, result in the processor performing as described herein. For example, when processor 710 accesses instructions within memory 712, processor 710 turns on one or both of radios 720 and 734 in response to user interaction.

Secure element 732 provides secure information storage. In some embodiments, secure element 732 is a smartcard compatible secure element commonly found in credit card applications and/or security applications. Near-field radio 734 provides near-field communications capability between mobile device personal digital ID device 700 and other devices nearby. In some embodiments, near-field radio 734 may be an ISO 14443 compatible radio operating at 13.56 megahertz, although this is not a limitation of the present invention.

In some embodiments, secure element 732 is combined with near-field radio 734 in a single integrated circuit such as a smartcard controller. In other embodiments, secure element 732, or a combination of secure element 732 and near-field radio 734 are integrated into another semiconductor device such as processor 710.

Examples of smart card controllers that combine secure element 732 with near-field radio 734 are the "SmartMX"

controllers sold by NXP Semiconductors N.V. of Eindhoven, The Netherlands. In some embodiments, the secure element has an ISO/IEC 7816 compatible interface that communicates with other components within personal digital ID device 700 (e.g., processor 710), although this is not a limitation of the present invention.

In some embodiments, secure element 732 includes applets, keys and digital certificates. Digital certificates are used to validate the identity of the certificate holder. Certificate authorities typically issue digital certificates. Digital certificates and their functionality are well known. Secure element applets and encryption keys are also well known. In some embodiments, personal digital ID device 700 makes available one or more of applets, keys, and/or digital certificates available to a service using either radio 720 or 734 in response to user interaction for a predetermined duration. Applets, keys, and certificates are examples of digital identifier 633 (FIG. 6).

Sensors 740 include one or more devices that may provide for user interaction. For example, sensors 740 may include a fingerprint sensor, a microphone, an imager, a motion sensor (e.g., accelerometer), or the like. In some embodiments, processor 710 may make a digital identifier available to a service in response to user interaction with one or more of sensors 740. Various embodiments of user interaction with sensors 740 are described more fully below.

Charging circuit 722 charges battery 724 and also senses the level of charge. For example, processor 710 may sense the battery charge level using charging circuit 722 and report the charge level using LEDs 420.

Battery 724 may be any type of battery capable of powering the components shown in FIG. 7. In some embodiments, battery 724 is removable, and in other embodiments, battery 724 is nonremovable.

Terminals 725 are used to provide power to the various components in personal digital ID device 700. Individual connections are not shown. In some embodiments, terminals 725 are disconnected when a connector on personal digital ID device 700 is disconnected. See FIG. 21 below.

Figure 8:
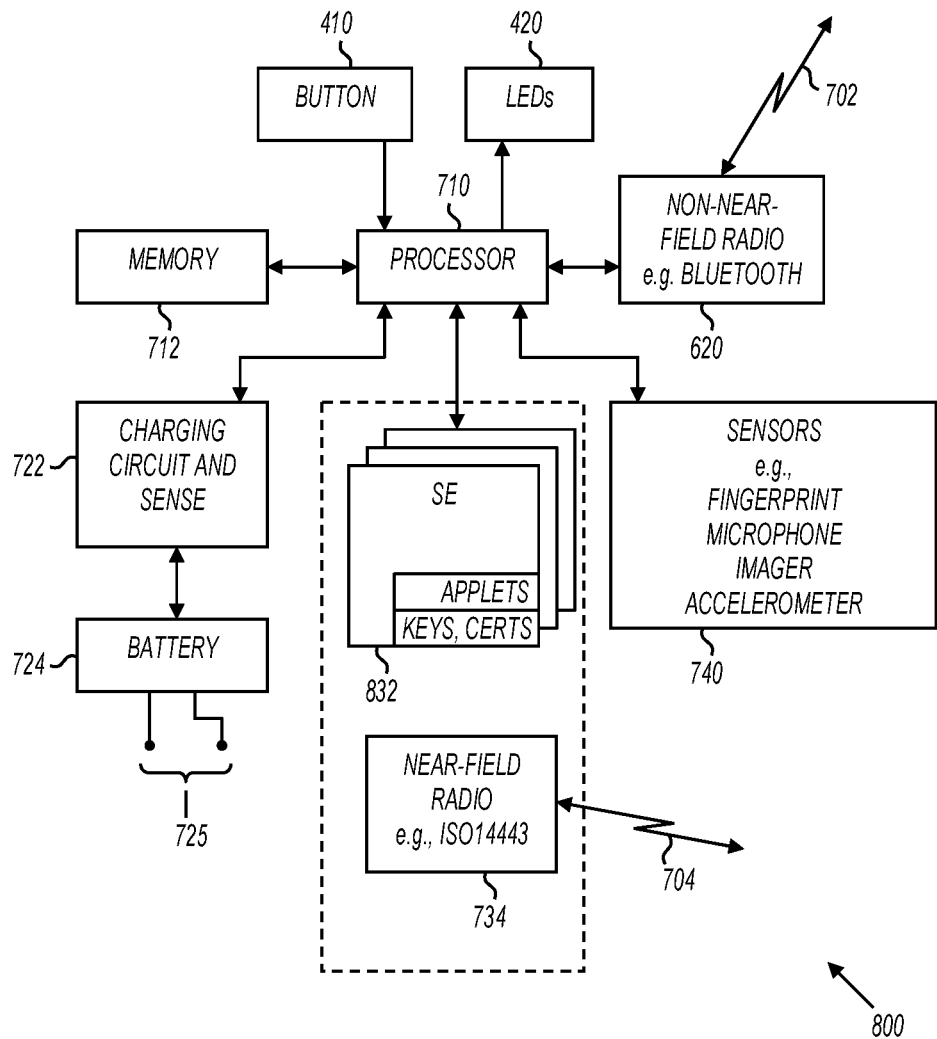

FIG. 8 shows a block diagram of a personal digital identity device in accordance with various embodiments of the present invention. Personal digital ID device 800 shows an example architecture for personal digital ID device 300 (FIG. 3) or personal digital ID device 400 (FIG. 4), or any of the other personal digital ID devices described herein.

Personal digital ID device 800 includes all the component of personal digital ID device 700 (FIG. 7), and also includes multiple secure elements 832. In some embodiments, the different secure elements are used for different purposes. For example, one secure element may be used for access control, while another secure element may be use for payments, and still another secure element may be used for authentication to a service.

FIG. 9 shows a personal digital identity device interacting with a laptop computer and cloud service in accordance with various embodiments of the present invention. As shown in FIG. 9, a user is wearing personal digital ID device 900, which is in the shape of a bracelet. Personal digital ID device 900 is shown communicating with mobile device 910 (e.g. laptop computer) using a non-near-field radio (e.g., BLUETOOTH™). The mobile device is in turn shown communicating with cloud service 440.

Personal digital ID device 900 communicates with mobile device 900 after user interaction. Example user interactions include, but are not limited to, button presses, motions, fingerprints, images, audio communications, or the like or any combination thereof. Examples of these user interactions and others are described more fully below.

In some embodiments some or all of the user authentication factors (UAF) such as fingerprints, motions, images or even passwords or PIN, or the like, or any combination thereof or any representation of such, could come to the personal digital ID device including 900 via the a radio link such as the BLUETOOTH™ non-near-field radio from a mobile device such as the laptop computer. The type of radio link (e.g. BLUETOOTH™) and the type of mobile device (e.g. laptop computer) for the personal digital ID device to receive UAF are provided as examples and the various embodiments of the invention are not so limited.

FIG. 10 shows a personal digital identity device interacting with a point of sale terminal in accordance with various embodiments of the present invention. As shown in FIG. 10, a user is wearing personal digital ID device 900, which is in the shape of a bracelet. Personal digital ID device 900 is shown communicating with point of sale (POS) device 1010 using a near-field radio (e.g., ISO 14443).

Personal digital ID device 900 communicates with POS 1010 after user interaction. Example user interactions include, but are not limited to, button presses, motions, fingerprints, images, audio communications, or the like or any combination thereof. Examples of these user interactions and others are described more fully below.

FIG. 11 shows a personal digital identity device with a removable crypto/cipher engine in accordance with various embodiments of the present invention. Personal digital ID device 1100 is shown accepting a subscriber identity module (SIM) card 1110, which includes a smartcard secure element, where the smartcard secure element is the crypto/cipher engine. In these embodiments, identities may be quickly changed. For example, a user may purchase personal digital ID device 1100 and then personalize it by inserting SIM card 1110 with the user's digital identifier installed. In some embodiments there may be more than one SIM card.

Figure 12:
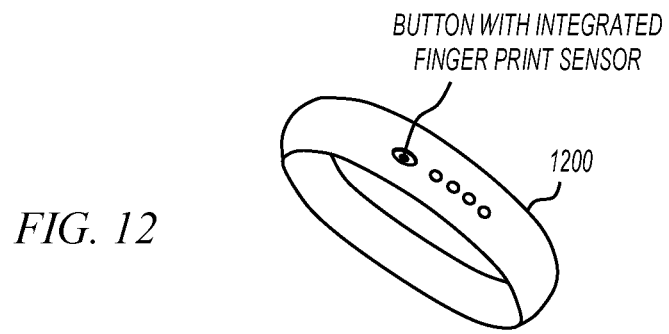
FIG. 12 shows a personal digital identity device with a fingerprint sensor in accordance with various embodiments of the present invention.

FIG. 12 shows a personal digital identity device with a fingerprint sensor in accordance with various embodiments of the present invention. Personal digital ID device 1200 includes a button with an integrated fingerprint sensor on the surface of the button. In operation, a user may press the button to interact with personal digital ID device 1200 as described above. In addition, personal digital ID device 1200 may take a fingerprint of the user.

In some embodiments, this corresponds to processor 710 (FIG. 7) receiving a fingerprint when the user presses the button. The fingerprint (or data representing the fingerprint) may be passed to SE 732 for comparison with a stored fingerprint to validate the user. If there is a match, the user is validated, and then the personal digital ID device may allow communication with a service outside the device.

Fingerprints may also be collected or verified during setup or configuration of personal digital ID device 1200. Setup and configuration are described more fully below.

Figure 13:
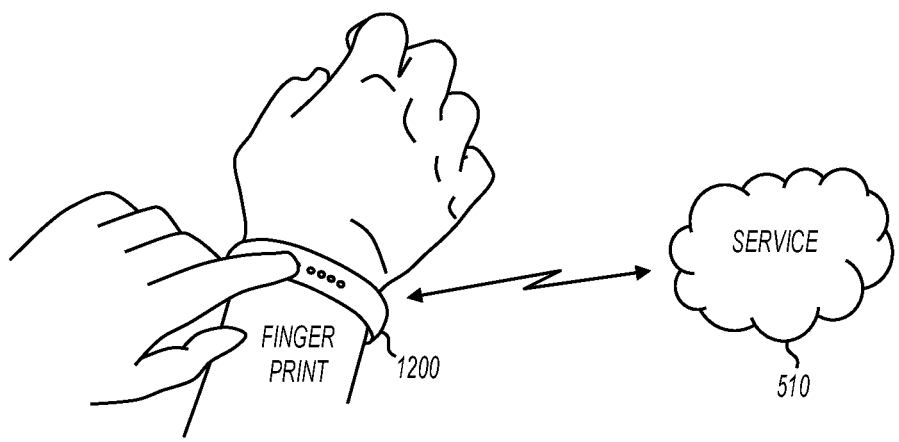
FIG. 13 shows a user interacting with the personal digital identity device of FIG. 12.

FIG. 13 shows a user interacting with the personal digital identity device of FIG. 12. As shown in FIG. 13, the user wearing personal digital ID device 1200 is pressing the button and providing a fingerprint at the same time. In response to the user interaction, personal digital ID device 1200 communicates with service 510.

In some embodiments the fingerprint user authentication factor comes to personal digital ID device 1200 via its radio link.

Figure 14:
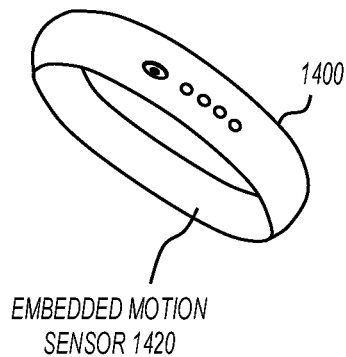
FIG. 14 shows a personal digital identity device with a motion sensor in accordance with various embodiments of the present invention.

FIG. 14 shows a personal digital identity device with a motion sensor in accordance with various embodiments of the present invention. Personal digital ID device 1400 includes an embedded motion sensor 1420. Embedded motion sensor 1420 may be any type of sensor capable of detecting motion. For example, motion sensor 1420 may be an accelerometer. In operation, a user may make motions to interact with personal digital ID device 1400 as described above.

In some embodiments, this corresponds to processor 710 (FIG. 7) receiving data from motion sensor 1420 that describes motion of the device. The data representing the motion may be passed to SE 732 for comparison with a stored value to validate the user. If there is a match, the user is validated, and then the personal digital ID device may allow communication with a service outside the device.

Motion data may also be collected or verified during setup or configuration of personal digital ID device 1400. Setup and configuration are described more fully below.

In some embodiments the motion data user authentication factor comes to the personal digital ID device 1400 via its radio link.

Figure 15:
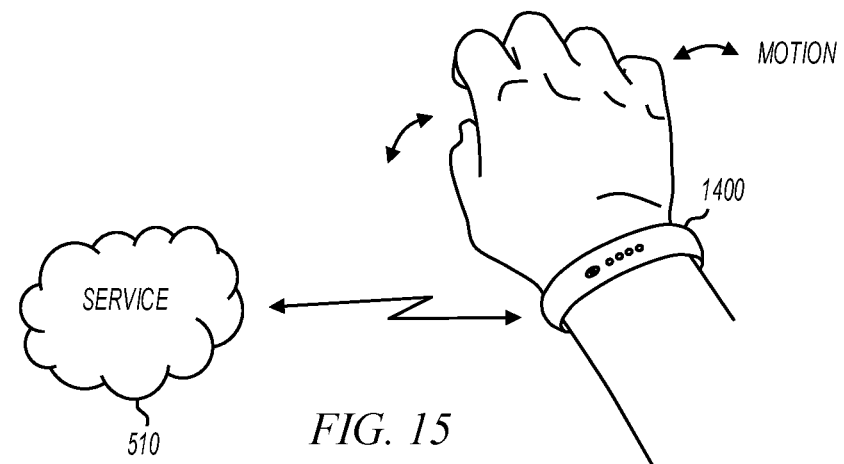
FIGS. 15 and 16 show users interacting with the personal digital identity device of FIG. 14.
Figure 16:
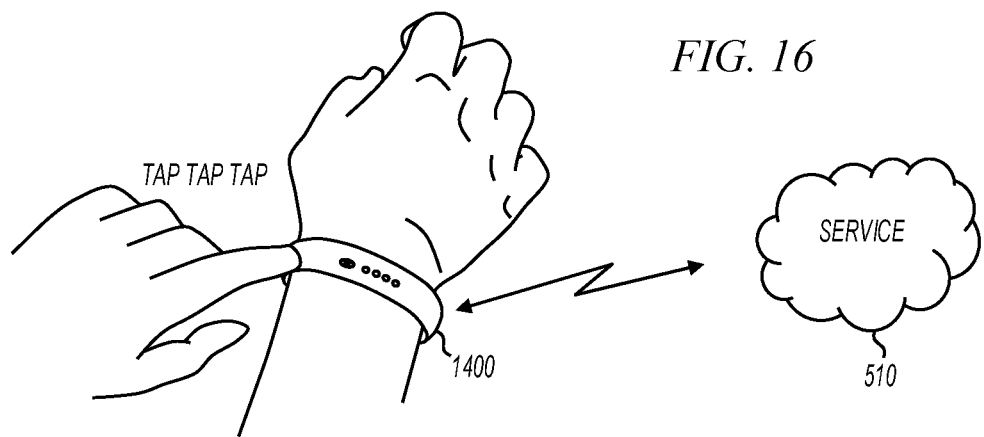

FIGS. 15 and 16 show users interacting with the personal digital identity device of FIG. 14. In FIG. 15, a user is shown interacting with personal digital ID device 1400 by making gross arm movements. In some embodiments, this may correspond to a gesture that is recognized by personal digital ID device 1400. When the gesture is recognized, personal digital ID device 1400 may allow communication with a service outside the device.

In FIG. 16, a user is shown interacting with personal digital ID device 1400 by making fine movements. In some embodiments, the fine movements are performed making a series of tapping motions with varying spacing and intensity. This may be viewed by a user as similar to typing a password, but instead of remembering and typing a character sequence, the user remembers and taps a rhythmic sequence.

Figure 17:
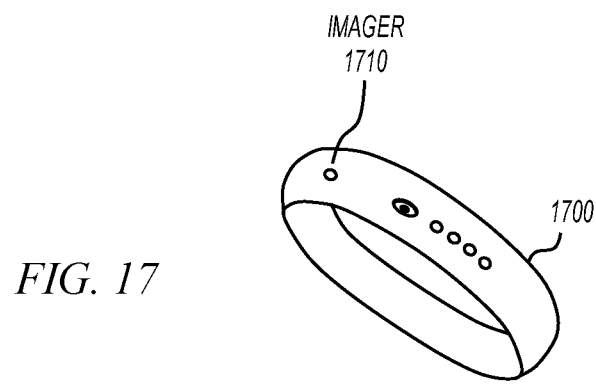
FIG. 17 shows a personal digital identity device with an imager in accordance with various embodiments of the present invention.

FIG. 17 shows a personal digital identity device with an imager in accordance with various embodiments of the present invention. Personal digital ID device 1700 includes imager 1710. Imager 1710 may be any type of image capture device. For example, imager 1710 may be a CMOS camera similar to those commonly found in smartphones. In operation, a user may capture an image to interact with personal digital ID device 1700 as described above.

In some embodiments, this corresponds to processor 710 (FIG. 7) receiving an image from imager 1710. The image may be of anything. For example, the image may be of a user's face, a user's personal possession, a landmark, or any other item. The data representing the image may be passed to SE 732 for comparison with a stored value to validate the user. If there is a match, then the personal digital ID device may allow communication with a service outside the device.

Image data may also be collected or verified during setup or configuration of personal digital ID device 1700. Setup and configuration are described more fully below.

Figure 18:
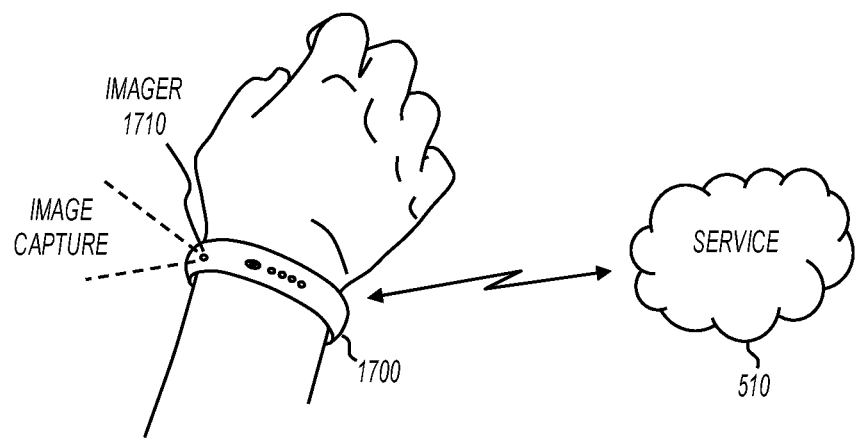
FIG. 18 shows a user interacting with the personal digital identity device of FIG. 17.

FIG. 18 shows a user interacting with the personal digital identity device of FIG. 17. As shown in FIG. 18, the user wearing personal digital ID device 1700 is capturing an image with imager 1710. In response to the user interaction, the user is validated, and personal digital ID device 1700 communicates with service 510.

In some embodiments the captured image user authentication factor comes to the personal digital ID device 1700 via its radio link.

Figure 19:
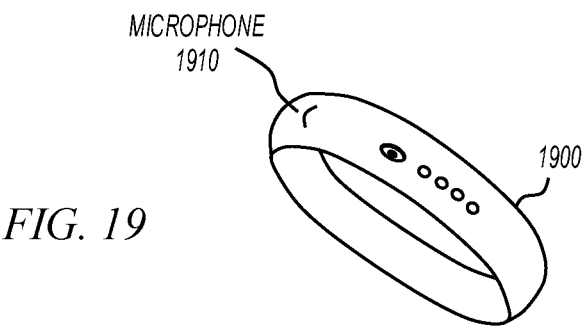
FIG. 19 shows a personal digital identity device with a microphone in accordance with various embodiments of the present invention.

FIG. 19 shows a personal digital identity device with a microphone in accordance with various embodiments of the present invention. Personal digital ID device 1900 includes microphone 1910. Microphone 1910 may be visible on personal digital ID device 19, or may not be visible. In operation, a user provides an audio signal to interact with personal digital ID device 1900 as described above.

In some embodiments, this corresponds to processor 710 (FIG. 7) receiving audio data from microphone 1910. The audio may represent anything. For example, a user may speak a phrase or provide another signature. The data representing the audio may be passed to SE 732 for comparison with a stored value to validate the user. If there is a match, the user is validated, and then the personal digital ID device may allow communication with a service outside the device. In some embodiments, this corresponds to performing a voiceprint analysis.

Audio data may also be collected or verified during setup or configuration of personal digital ID device 1900. Setup and configuration are described more fully below.

Figure 20:
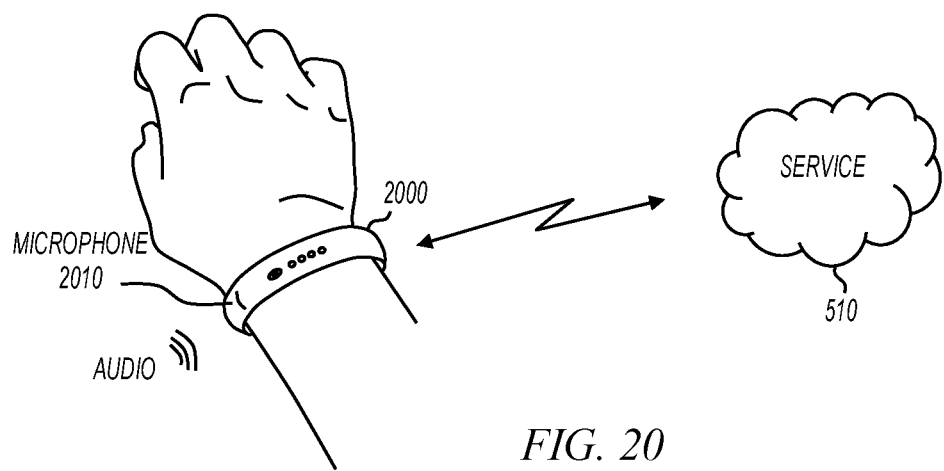
FIG. 20 shows a user interacting with the personal digital identity device of FIG. 19.

FIG. 20 shows a user interacting with the personal digital identity device of FIG. 19. As shown in FIG. 20, the user wearing personal digital ID device 2000 is capturing audio information with microphone 2010. In response to the user interaction, personal digital ID device 2000 communicates with service 510.

In some embodiments the audio information user authentication factor comes to the personal digital ID device 2000 via its radio link.

Figure 21:
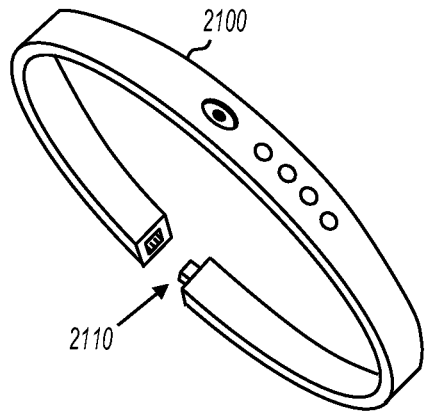
FIG. 21 shows a personal digital identity device with a connector.

FIG. 21 shows a personal digital identity device with a connector. Personal digital ID device 2100 includes connector 2110. In some embodiments, connector 2110 is strictly a mechanical connector. For example, connector 2110 may be disconnected while all electrical functionality remains intact. In other embodiments, connector 2110 is a mechanical connector as well as an electrical connector. In these embodiments, the electrical connector may disconnect the battery when the connector is open. In operation, connector 2110 allows the bracelet shape of personal digital ID device 2100 to be open or closed.

Figure 22:
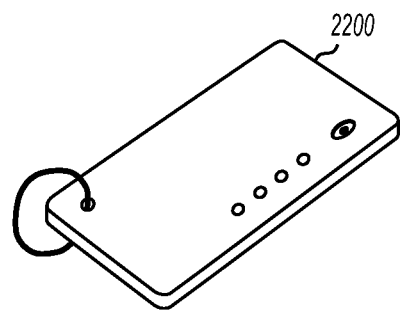
FIG. 22 shows an alternate form factor personal digital identity device in accordance with various embodiments of the present invention.

FIG. 22 shows an alternate form factor personal digital identity device in accordance with various embodiments of the present invention. Personal digital ID device 2200 is shown as a key fob, but this is not a limitation of the present invention. For example, personal digital ID device 2200 may take any form, including for example, a credit card shape.

Figure 23:
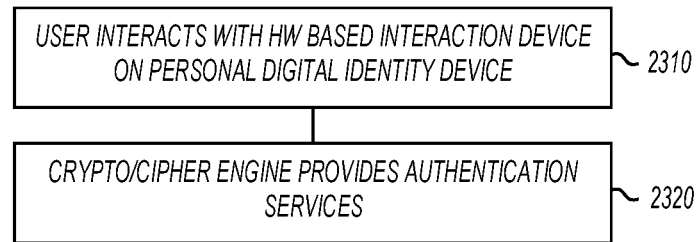
FIGS. 23-25 show flowcharts of methods in accordance with various embodiments of the present invention.

FIG. 23 shows a flowchart of methods in accordance with various embodiments of the present invention. In some embodiments, method 2300 may be performed by a personal digital ID device such as any of those shown in previous figures. Further, in some embodiments, method 2300 may be performed by a processor such as processor 710 (FIG. 7). Method 2300 is not limited by the type of system or entity that performs the method. The various actions in method 2300 may be performed in the order presented, in a different order, or simultaneously. Further, in some embodiments, some actions listed in FIG. 23 are omitted from method 2300.

Method 2300 begins at 2310 in which a user interacts with a hardware-based interaction device on a personal digital identity device. In some embodiments, this corresponds to a user pressing a button, or providing a fingerprint, motion, an image, or audio. At 2320, a crypto/cipher engines provides authentication services.

In some embodiments, the actions of method 2300 are performed by a processor configured to perform the operations by virtue of stored software instructions. For example, processor 710 (FIG. 7) may be configured to perform actions corresponding to receiving user interactions, and making a digital identifier available for a predetermined time in response thereto. The digital identifier may be made available by turning one or more radios, such as a near-field radio and/or a non-near-field radio.

Figure 24:
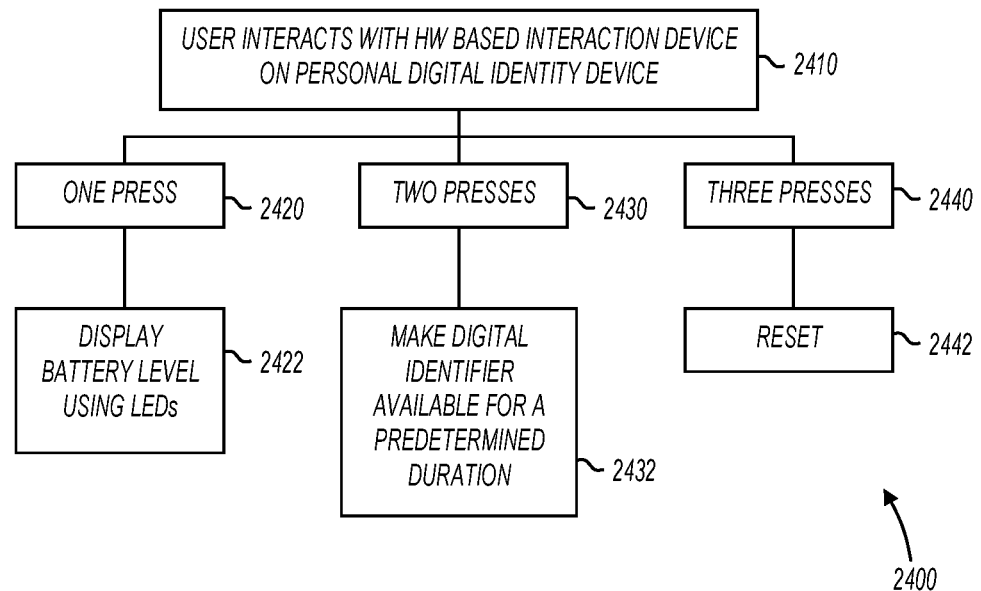

FIG. 24 shows a flowchart of methods in accordance with various embodiments of the present invention. In some embodiments, method 2400 may be performed by a personal digital ID device such as any of those shown in previous figures. Further, in some embodiments, method 2400 may be performed by a processor such as processor 710 (FIG. 7). Method 2400 is not limited by the type of system or entity that performs the method. The various actions in method 2400 may be performed in the order presented, in a different order, or simultaneously. Further, in some embodiments, some actions listed in FIG. 24 are omitted from method 2400.

Method 2400 begins at 2410 in which a user interacts with a hardware-based interaction device on a personal digital identity device. In some embodiments, this corresponds to a user pressing a button, or providing a fingerprint, motion, an image, or audio. Different actions are taken depending on the number of button presses. If there has been one button press 2420, then the personal digital ID device displays a battery level at 2422. If there have been two button presses 2430, then the personal digital ID device makes a digital identifier available for a predetermined duration at 2432. If there have been three button presses 2440, then the personal digital ID device performs a reset at 2442.

In some embodiments, the actions of method 2400 are performed by a processor configured to perform the operations by virtue of stored software instructions. For example, processor 710 (FIG. 7) may be configured to perform actions corresponding to receiving user interactions, and performing different actions based on the type of user interaction that occurred.

Method 2400 provides one set of possible actions that are performed in response to different user interactions. In some embodiments, different user interactions are received, and different actions are performed in response. For example, a user may press a button for a predetermined duration rather than just once, twice, etc. Any action may be taken in response to the long button press. Also for example, a user may provide a fingerprint, motion, imagery, or audio. In some embodiments, these may be provided in addition to a button press.

Figure 25:
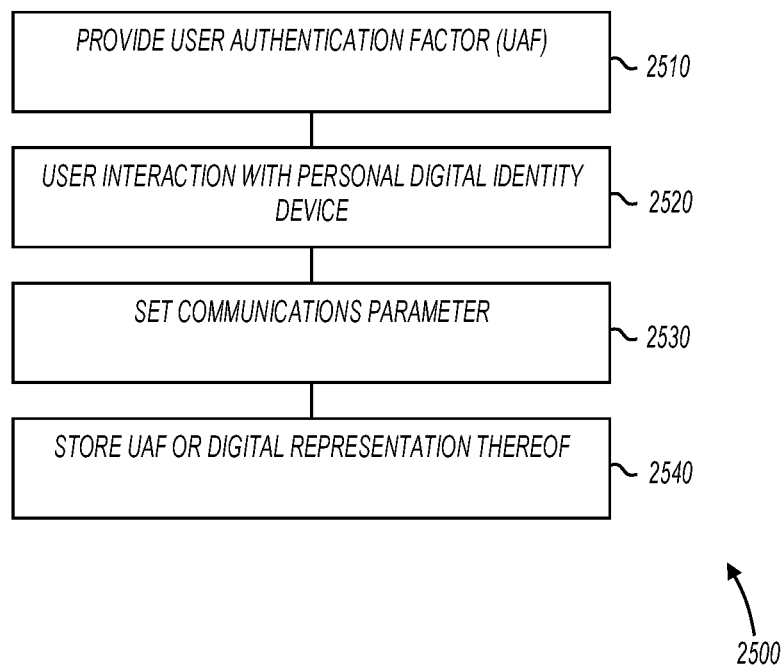

FIG. 25 shows a flowchart of methods in accordance with various embodiments of the present invention. In some embodiments, method 2500 may be performed by a personal digital ID device such as any of those shown in previous figures. Further, in some embodiments, method 2500 may be performed by a processor such as processor 710 (FIG. 7). Method 2500 is not limited by the type of system or entity that performs the method. The various actions in method 2500 may be performed in the order presented, in a different order, or simultaneously. Further, in some embodiments, some actions listed in FIG. 25 are omitted from method 2500. The actions of method 2500 provide for configuration or setup of a personal digital ID device.

Method 2500 begins at 2510 in which a user provides a user authentication factor (UAF). The user authentication factor may be any information provided by a user to authenticate. Examples include, but are not limited to voiceprint, motion, fingerprint, or imagery. At 2520, the user interacts with the personal digital identity device. In some embodiments, this corresponds to pressing a button one or more times, or pressing a button for a predetermined duration. At 2530, communications parameters are set. In some embodiments, this corresponds to a BLUETOOTH™ radio becoming discoverable or discovering other devices. At 2540, the UAF (or a digital representation thereof) is stored. In some embodiments, LEDs, such as LEDs 420 (FIG. 4) are used to report communication parameters.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

We claim:
1. A key fob comprising:
a crypto/cipher engine having at least one digital identifier including one or more keys for a challenge-response;
a button accessible to a user of the key fob;
a fingerprint sensor positioned on a surface of the button to allow for fingerprint scanning when the user interacts with the button;
a radio; and
a processor circuitry coupled to the crypto/cipher engine, the button, the fingerprint sensor, and the radio, wherein the processor circuitry is to validate the user through a fingerprint scan, wherein the processor circuitry is to make the one or more keys for the challenge-response available to perform authentication with a cloud service through a device, and wherein the processor circuitry is to power the radio for a predetermined duration based on an interaction of a validated user with the button.
2. The key fob of claim 1, wherein the processor circuitry is to display a battery level in response to a second interaction with the button.
3. The key fob of claim 1 comprising a connector that when opened modifies electrical functionality of the key fob.
4. The key fob of claim 1, wherein the crypto/cipher engine comprises a smartcard controller.
5. The key fob of claim 1, wherein the crypto/cipher engine comprises a plurality of smartcard secure elements.
6. The key fob of claim 1, wherein the crypto/cipher engine is user-removable from the key fob.
7. The key fob of claim 1, wherein the crypto/cipher engine resides on a subscriber identity module (SIM) card.
8. The key fob of claim 1, wherein the radio comprises a near-field radio.
9. The key fob of claim 8, wherein the near-field radio comprises an ISO 14443 compatible radio.
10. The key fob of claim 8, wherein the near-field radio comprises an ISO 18092 compatible radio.
11. The key fob of claim 1, wherein the radio comprises a non-near-field radio.
12. The key fob of claim 11, wherein the non-near-field radio comprises a Bluetooth radio.
13. The key fob of claim 1, wherein the radio comprises a near-field radio and a non-near-field radio.
14. The key fob of claim 1, wherein the one or more keys for the challenge-response comprises a symmetric key.
15. The key fob of claim 1, wherein the one or more keys for the challenge-response comprises an asymmetric key.
16. A key fob comprising:
a crypto/cipher engine having at least one digital identifier including one or more keys for a challenge-response;
a connector that when opened modifies electrical functionality of the key fob;
a button accessible to a user of the key fob;

a fingerprint sensor positioned on a surface of the button to allow for fingerprint scanning when the user interacts with the button;

a radio; and a processor coupled to the crypto/cipher engine, the button, the fingerprint sensor, the radio, and the connector, wherein the processor is to validate the user through a fingerprint scan, wherein the processor is to make the one or more keys for the challenge-response available to perform authentication with a cloud service through a device, and wherein the processor is to power the radio for a predetermined duration based on an interaction of a validated user with the button.

17. The key fob of claim 16, wherein the crypto/cipher engine comprises a smartcard controller.

18. The key fob of claim 16, wherein the crypto/cipher engine comprises a plurality of smartcard secure elements.

19. The key fob of claim 16, wherein the radio comprises a non-near-field radio.

20. The key fob of claim 19, wherein the non-near-field radio comprises a Bluetooth radio.

* * * * *